(12) United States Patent
Mochizuki et al.

(10) Patent No.: US 7,944,646 B2
(45) Date of Patent: May 17, 2011

(54) MAGNETIC DISK DRIVE

(75) Inventors: Masafumi Mochizuki, Kanagawa-ken (JP); Yukiya Shimizu, Kanagawa (JP); Shuji Nishida, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 695 days.

(21) Appl. No.: 12/008,276

(22) Filed: Jan. 9, 2008

(65) Prior Publication Data
US 2008/0180839 A1    Jul. 31, 2008

(30) Foreign Application Priority Data
Jan. 18, 2007   (JP) ................. 2007-009094

(51) Int. Cl.
*G11B 5/127* (2006.01)
(52) U.S. Cl. .................................. 360/125.1
(58) Field of Classification Search ........... 360/125.1, 360/125.3, 125.03, 125.13, 319, 310, 125.26, 360/317, 125.12, 125.06, 125.14, 125.16; 428/828.1
See application file for complete search history.

(56) References Cited

U.S. PATENT DOCUMENTS

| | | | |
|---|---|---|---|
| 6,822,862 B2 | 11/2004 | Rong-Yao | |
| 7,097,924 B2 | 8/2006 | Haginoya et al. | |
| 7,394,620 B2 * | 7/2008 | Taguchi | 360/125.03 |
| 2002/0176214 A1 | 11/2002 | Shukh et al. | |
| 2004/0091748 A1 | 5/2004 | Kamata et al. | |
| 2005/0141137 A1 | 6/2005 | Okada et al. | |
| 2006/0066984 A1 | 3/2006 | Tagami | |
| 2006/0262453 A1 * | 11/2006 | Mochizuki et al. | 360/125 |
| 2007/0254189 A1 * | 11/2007 | Nakagawa et al. | 428/828.1 |
| 2008/0180861 A1 * | 7/2008 | Maruyama et al. | 360/319 |
| 2009/0168241 A1 * | 7/2009 | Mochizuki et al. | 360/125.03 |

FOREIGN PATENT DOCUMENTS

| | | |
|---|---|---|
| JP | 06-119632 A | 4/1994 |
| JP | 2004-127480 | 4/2004 |
| JP | 2006-134540 | 5/2006 |

OTHER PUBLICATIONS

SB08B not used in this IDS.
The extended European Search Report corresponding to the Application No. 08250003.4-1232, date of mailing Apr. 20, 2009, 8 pages total.

* cited by examiner

*Primary Examiner* — Allen T Cao
(74) *Attorney, Agent, or Firm* — Patterson & Sheridan, LLP

(57) ABSTRACT

In a patterned perpendicular magnetic recording medium, embodiments of the present invention provide a magnetic head in which magnetic field to be applied to adjacent tracks can be suppressed and a recording device equipped with the magnetic head. In one embodiment of the present invention, a sum of a width Pw of a main pole of a magnetic head and distances between right and left magnetic substances on a width-directional side of tracks and the main pole, so-called widths of side gap lengths s_g1_1 and s_g1_2 is, in a magnetic recording medium having a soft-magnetic underlayer, made to be not more than a sum of a width w_land of a convexity or land of the soft-magnetic underlayer and widths w_groove_1 and w_groove_2 of concavities or grooves adjacent to the land on both its sides.

7 Claims, 16 Drawing Sheets

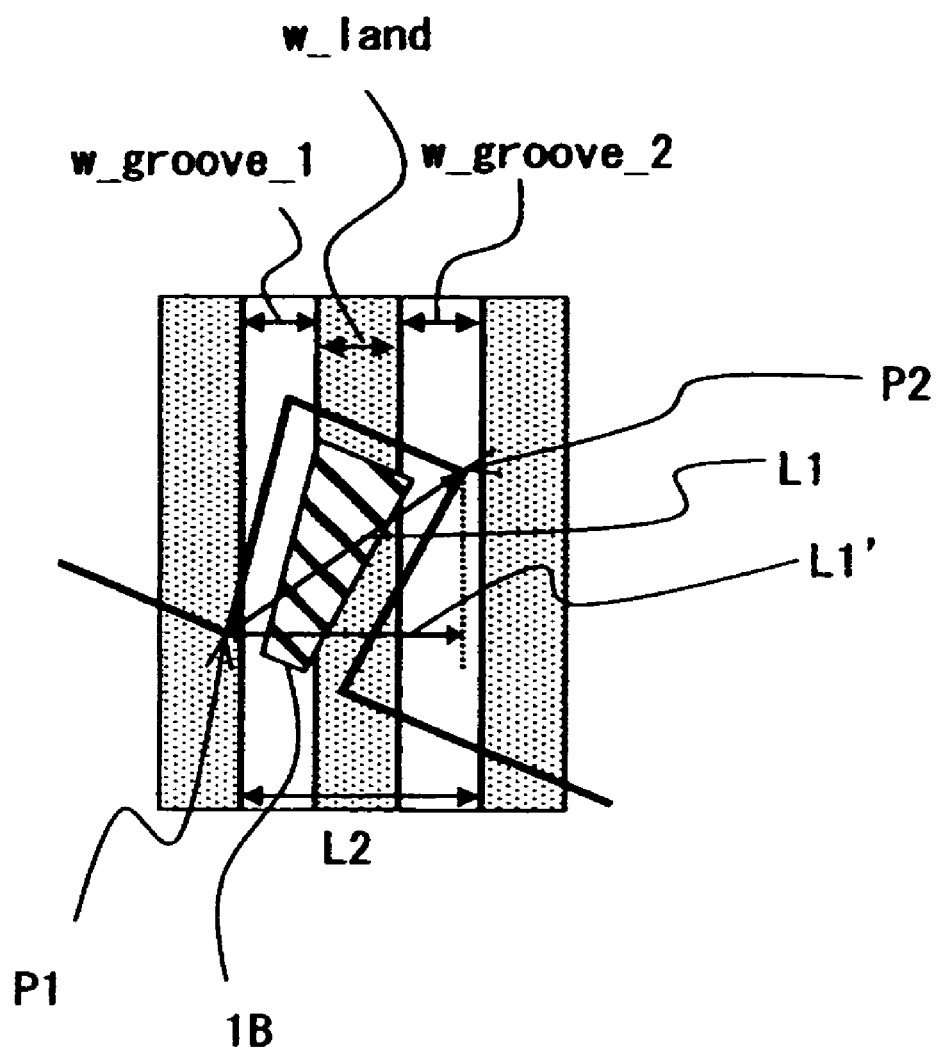

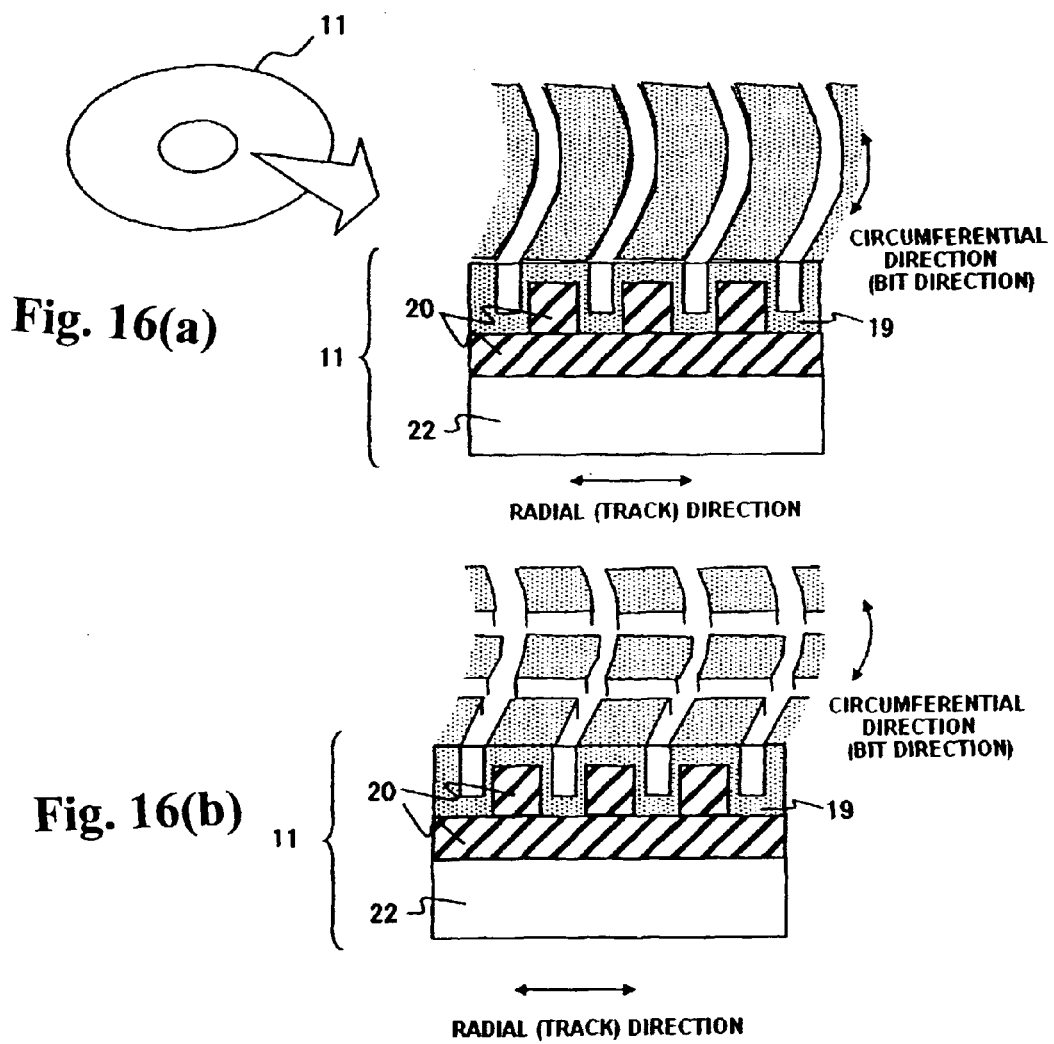

MAGNETIC DISK DRIVE

CROSS-REFERENCE TO RELATED APPLICATION

The instant nonprovisional patent application claims priority to Japanese Patent Application No. 2007-009094 filed Jan. 9, 2007 and which is incorporated by reference in its entirety herein for all purposes.

BACKGROUND OF THE INVENTION

A magnetic recording and reproducing device comprises a magnetic recording medium and a magnetic head, and data on the magnetic recording medium is read and written by means of the magnetic head. In order to increase recording capacity per unit area on the magnetic recording medium, it is required to increase area recording density. However, decreasing a recording bit length causes a problem that the area recording density cannot be increased due to thermal fluctuation in magnetization of the medium. Generally, influence by the thermal fluctuation will increase as the value of $Ku \cdot V/kT$ is smaller, where Ku, V, k, and T represent a magnetic anisotropy constant, a minimum unit volume for magnetization, a Boltzmann constant, and an absolute temperature, respectively. Accordingly, Ku or V is required to be increased so as to decrease the influence by the thermal fluctuation.

As a solution to this problem, a perpendicular recording method has been developed. The perpendicular recording method records magnetic signals on a double-layered perpendicular medium having a soft-magnetic underlayer with a single-pole head perpendicularly. This method can apply a stronger recording magnetic field to the medium. Therefore, a recording layer of a medium with a large magnetic anisotropy constant (Ku) can be used. Besides, in a magnetic recording medium in the perpendicular magnetic recording method, an advantage of increasing V while keeping the magnetic particle diameter on the medium surface small, or keeping the bit length small has been achieved by growing magnetic particles in the film thickness direction. However, a limit to the thermal fluctuation resistance is predicted even in the perpendicular magnetic recording method if higher-density magnetic recording media are realized in the future.

As an example of recording media suitable for high-density recording, a scheme to align magnetically-isolated magnetic particles regularly and to record one bit per particle, so-called patterned media, is known. This scheme is considered to be advantageous for high-density magnetic recording because noises caused by fluctuation of magnetized state in a bit transition region do not occur and one bit can be made as small as possible until reaching a thermal fluctuation limit. Similarly, discrete tracks which magnetically isolate tracks only and the like are known. These schemes are characterized by that the size of the bit to be recorded in a track width direction is decided in accordance with the size of convexes (lands) of the medium.

FIG. 12 schematically illustrates a relationship between a perpendicular recording head 14 and a magnetic disk 11 and the perpendicular recording. A conventional magnetic head is configured with a lower shield 8, a reproducing element 7, an upper shield 9, an auxiliary pole 3, a thin film coil 2, and a main pole 1 which are laminated in order from the side of the traveling direction of the head (the leading side). The lower shield 8, the reproducing element 7, and the upper shield 9 constitute a reproducing head 24; and the auxiliary pole 3, the thin film coil 2, and the main pole 1 comprise a recording head (a single pole head) 25.

The main pole 1 is constituted by a main pole yoke 1A bonded to the auxiliary pole via a pillar 17 and a main pole tip 1B which is exposed on a flying surface and defines a track width. Magnetic field from the main pole 1 of the recording head 25 forms a magnetic circuit passing through a magnetic recording layer 19 and a soft-magnetic underlayer 20 and entering into the auxiliary pole 3 to record a magnetic pattern on a magnetic recording layer 19. An intermediate layer may be formed between the magnetic recording layer 19 and the soft-magnetic underlayer 20. As a reproducing element 7 of the reproducing head 24, a giant magneto-resistive effect (GMR) element, a tunnel magneto-resistive effect (TMR) element, or the like is used.

Since the head structure shown in FIG. 12 includes the auxiliary pole 3 and the thin film coil 2 between the reproducing element 7 and the main pole 1, the distance between the recording head and the reproducing head becomes large so that format efficiency is disadvantageously deteriorated. Therefore, as shown in FIG. 13(a), a structure has come to be adopted in which the auxiliary pole 3 is provided on the trailing side of the main pole 1. This structure enables to make the distance between the recording head and the reproducing head small. FIG. 13(b) is a view of the flying surface of the magnetic head 24 viewed from the side of the magnetic disk 11. As shown in FIG. 13(b), the shape of the flying surface of the main pole 1 is desirably a trapezoid whose width of the leading side is narrower, taking account of the head having a skew angle.

In addition to the field strength of the recording head, a field gradient in a profile of a perpendicular component of the head field to record a boundary of a recording bit cell, i.e., a field gradient in a profile of a perpendicular component of the head field in the traveling direction of the head is an important factor to realize a high recording density. To accomplish a higher recording density in the future, the field gradient must be increased much more. To increase the recording field gradient, there has been a structure that provides a magnetic substance, i.e., a so-called trailing shield 32 at the trailing side of the main pole 1, as shown in FIG. 14. Further, another structure has been provided in which so-called side shields 33 are also provided on the side surface of the main pole 1.

Similarly, as shown in FIG. 13(a), in the case that the auxiliary pole 3 forming a closed flux path is provided at the trailing side of the main pole 1, the trailing shield 32 and the side shields 33 may be provided, too. As shown in FIG. 15(a), the coil may be a coil which is wound around the main pole yoke 1A and the main pole tip 1B, a so-called helical coil.

In the case of patterned media or discrete media, concavities and convexities are provided on the magnetic recording layer 19 and the soft-magnetic underlayer 20 as shown in FIG. 16 for example. In addition to this, concaves and convexities may be provided on a non-magnetic film and a substrate which are underlayers of the magnetic recording layer. FIG. 16(a) schematically shows a discrete medium on which concavities and convexities (grooves and lands) are provided in its radial direction in order to define tracks along the circumferential direction. In FIG. 16(b), concavities and convexities are provided in the bit direction, too, to define bit patterns.

There have been examples that the substrate is flat and concavities and convexities are provided on the soft-magnetic underlayer 20 and the magnetic recording layer 19 and that concavities and convexities are provided on the magnetic recording layer 19 only. These are disclosed in Japanese Patent Publication No. 2004-259306 and Japanese Patent Publication No. 2004-164492. Japanese Patent Publication No. 6-119632 discloses a technique regarding data erasure on the on-track by data in a stray field, but this is different from the influence to adjacent tracks due to the recording field from the main pole excited by record current, which is considered by embodiments of the present invention.

As described above, in the schemes using media with concavities and convexities provided thereon, the size of the recording bit in the track width direction is defined by the convexities (lands) on the medium. However, similarly to the conventional schemes, the field strength applied to the tracks adjacent to the track to be written in must be decreased to eliminate attenuation and deletion of the magnetized information which had already been recorded in the adjacent tracks.

From the foregoing, it must be required for achieving higher recording density to reduce the record track width without attenuating or deleting the data in the adjacent tracks. This is the problem to be solved in order to realize higher recording density of the magnetic disk drive utilizing the perpendicular magnetic recording. Especially, the inventors have found that, if lands and grooves are formed by providing concavities and convexities in the radial direction on the soft-magnetic underlayer 20, a magnetic flux is concentrated on the edges of the lands on the soft-magnetic underlayer of the adjacent tracks so that the field strength increases.

BRIEF SUMMARY OF THE INVENTION

In a patterned perpendicular magnetic recording medium, embodiments of the present invention provide a magnetic head in which magnetic field to be applied to adjacent tracks can be suppressed and a recording device equipped with the magnetic head. According to the particular embodiment of FIG. 2, a sum of a width Pw of a main pole 1 of a magnetic head 14 and distances between right and left magnetic substances 33 on a width-directional side of tracks and the main pole 1, so-called widths of side gap lengths s_g1_1 and s_g1_2 is, in a magnetic recording medium having a soft-magnetic underlayer, made to be not more than a sum of a width w_land of a convexity or land of the soft-magnetic underlayer and widths w_groove_1 and w_groove_2 of concavities or grooves adjacent to the land on both its sides.

BRIEF DESCRIPTION OF THE DRAWINGS

FIG. 4 is a schematic plan view showing the position of the magnetic head according to the present embodiment when a skew is generated.

FIGS. 16(a) and 16(b) are schematic drawings of a discrete medium and a patterned medium according to a conventional technique.

DETAILED DESCRIPTION OF THE INVENTION

Figure 1:
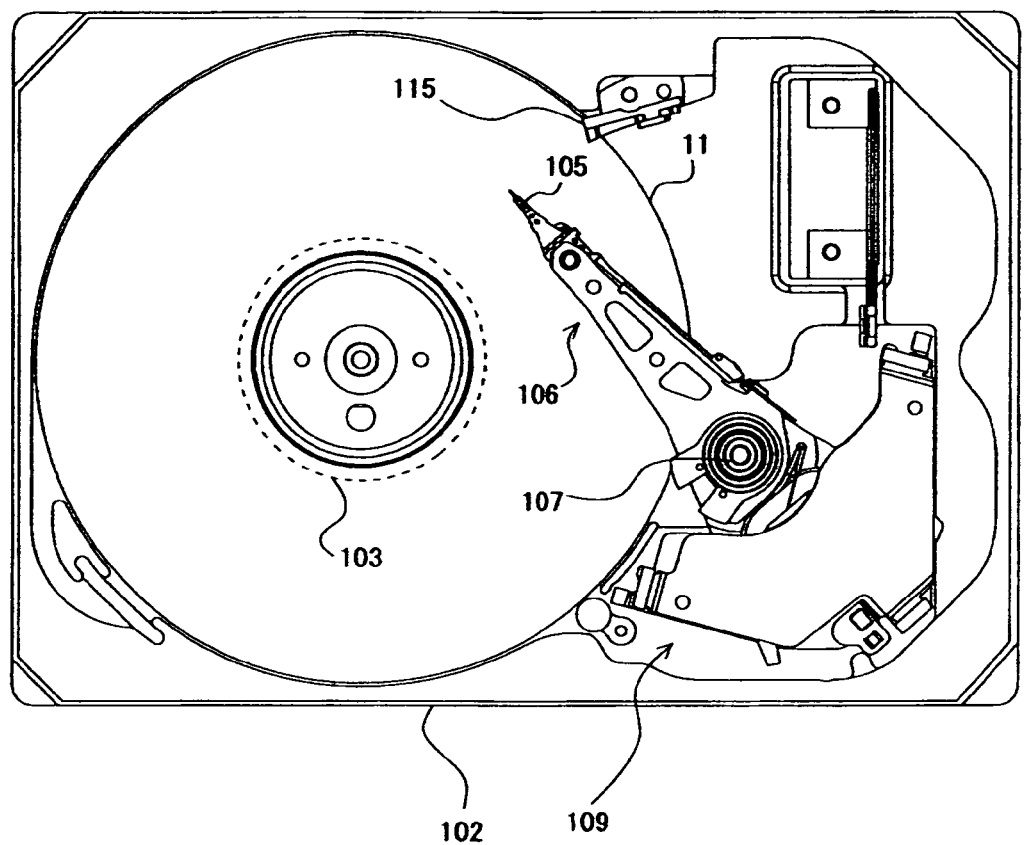
FIG. 1 is a plan view schematically showing the entire configuration of the HDD according to the present embodiment.

Embodiments of the present invention relate to a magnetic disk drive, particularly to a magnetic disk drive equipped with a magnetic head having side shields for perpendicular magnetic recording and a magnetic disk having a concavo-convex structure for defining a track width.

It is an object of embodiments of the present invention to solve the problem that the data on the adjacent tracks are attenuated or deleted by the leaked recording field from the main pole to the adjacent track excited by the recording current running through the coil in the recording head.

A magnetic disk device according to an aspect of embodiments of the present invention comprises a magnetic disk for perpendicular magnetic recording and a magnetic head for perpendicular magnetic recording. The magnetic disk has a magnetic recording layer and an underlayer under the magnetic recording layer, and further including a groove and a land for defining a track width on at least one of the magnetic recording layer and the underlayer. The magnetic head has a main pole, an auxiliary pole, and side shields which are located on the both sides of the track width direction of the main pole and are made of a magnetic substance. A sum of a width of the main pole for defining the track width and both side gaps between the main pole and the side shields on both sides of the main pole is not more than a sum of a width of the land and widths of grooves on both sides of the land. This structure enables to reduce the magnetic field applied to the adjacent tracks and to suppress deletion or decrease of data on the adjacent tracks so that the recording track width can be narrowed to achieve higher density.

Preferably, a distance between respective trailing-side ends of the both side shields is not more than the sum of the width of the land and the widths of grooves on both sides of the land. Thereby, deletion and decrease of data in the adjacent tracks can be effectively suppressed.

Preferably, a distance between respective leading-side ends of the both side shields is not more than the sum of the width of the land and the widths of grooves on both sides of the land. Thereby, deletion and decrease of data in the adjacent tracks can be effectively suppressed.

A maximum angle of a skew angle of the magnetic head to a track is denoted by S; a distance from a leading-side end of one of the side shields to an inner-side end of the other side shield located on its opposed corner is denoted by L1; a length of a line that the L1 is projected in the track width direction at the maximum skew angle S is denoted by L1'; and a sum of the width of the land and the widths of the grooves on the both sides of the land is denoted by L2. In this case, the L2 is preferably not less than the L1'. Thereby, deletion and decrease of data in the adjacent tracks can be effectively suppressed.

The underlayer can be a soft-magnetic underlayer. Or, the underlayer may be a non-magnetic layer and the magnetic recording layer may have a groove and a land for defining the track width. Or, concavities and convexities may be provided on the magnetic recording layer for forming recording bits in a bit direction.

Embodiments of the present invention achieve higher density in the magnetic recording and reproducing device by reducing the field applied to the adjacent tracks and narrowing the recording track width while suppressing deletion and reduction of data on the adjacent tracks.

Hereinafter, embodiments of the present invention are described while referring to the accompanying drawings. Throughout the drawings, the same components are denoted by like reference numerals, and their repetitive description is omitted if not necessary for the sake of simplicity. In the embodiments described below, the present invention is applied to a hard disk drive (HDD) by way of example of magnetic disk drives. The HDD according to the present embodiment comprises a perpendicular magnetic recording head having a main pole and an auxiliary pole and patterned media or discrete media with concavities and convexities on the media. An object of the present embodiment is to reduce magnetic fields applied to adjacent tracks in writing in the magnetic disk by the perpendicular magnetic recording head.

FIG. 1 is a top view of an HDD with a top cover removed from its housing. The HDD comprises a magnetic disk 11 which is a disk for recording data thereon. The magnetic disk 11 according to the present embodiment has a concavo-convex structure described with referring to FIG. 16(a). Namely, it has grooves (concavities) and lands (convexities) placed alternately in the radial direction. In addition, as shown in FIG. 16(b), it may have the concavo-convex structure in the bit direction (circumferential direction).

The head slider 105 comprises a magnetic head which writes and/or reads data input and/or output from and/or to an external host (not shown) to and/or from the magnetic disk 11 and a slider on a surface of which the magnetic head is formed. The magnetic head contains a recording element which converts electric signals to magnetic fields according to the data to be stored on the magnetic disk 11 and a reproducing element which converts magnetic fields from the magnetic disk 11 to electric signals. The structure of the magnetic disk 11 will be described in detail later.

An actuator 106 supports and moves the head slider 105. The actuator 106 is supported pivotably by a pivotal axis 107 and is driven by a voice coil motor (referred to as VCM hereinbelow) 109 as a driving mechanism. The assembly of the actuator 106 and the VCM 109 is a moving mechanism for the head slider 105. The magnetic disk 11 is supported by a spindle motor (referred to as SPM hereinbelow) 103 fixed to a base 102 and is rotated by the SPM 103 at a predetermined angular rate.

The actuator 106 moves the head slider 105 to above the data region on the surface of the rotating magnetic disk 11 to read and write data from and to the magnetic disk 11. The pressure by air viscosity between the air bearing surface (ABS) of the slider facing the magnetic disk 11 and the rotating magnetic disk 11 balances to a pressure applied toward the magnetic disk 11 by the actuator 106 for the head slider 105 to fly over the magnetic disk 11 with a certain gap.

When the magnetic disk 11 stops rotating or the like, the actuator 106 retracts the head slider 105 from above the data region to a ramp 115. The operation of the foregoing each component is controlled by a control circuit on a control circuit board (not shown). The embodiments of the present invention can be applied to the contact start and stop (CSS) scheme in which the head slider 105 is retracted to a zone located in an inner periphery of the magnetic disk 11 when the head slider 105 does not write or read data. For the sake of simplicity, the above-described HDD is a type that the number of the magnetic disk 11 is one and the storage surface is one side, but it may be equipped with one or more magnetic disks with the both sides of storage surfaces.

Figure 2:
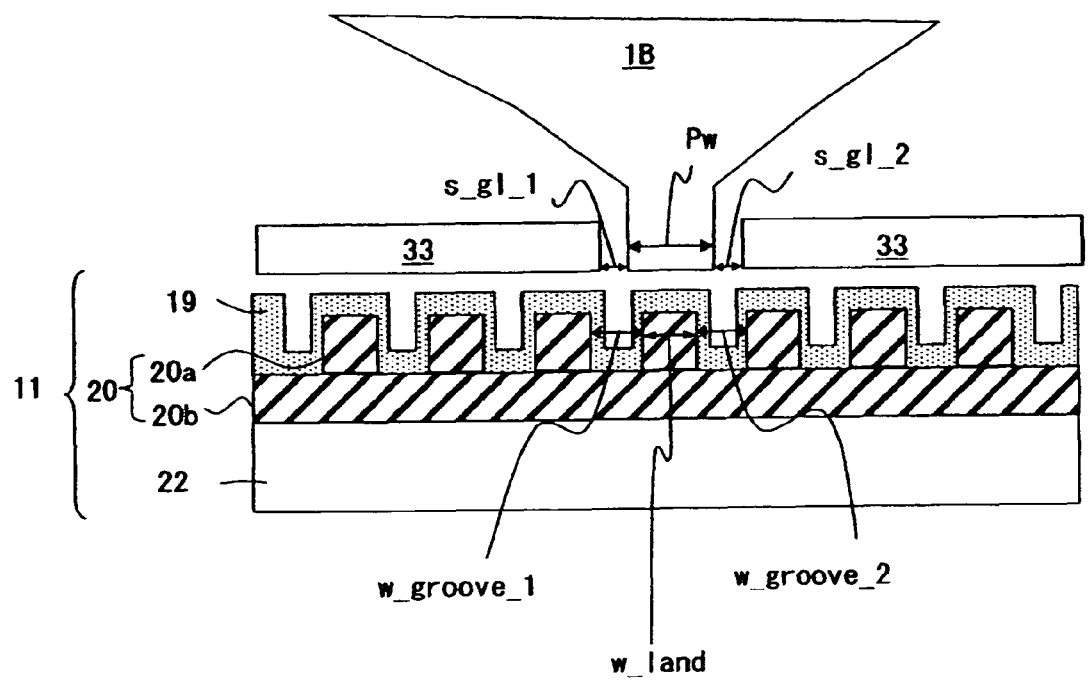
FIG. 2 is a schematic plan view of an example of the magnetic head and magnetic recording medium according to the present embodiment at the main pole trailing end viewed from the trailing direction.

FIG. 2 shows the magnetic disk 11 and a tip end portion of a main pole tip 1B of the magnetic head 14 according to the present embodiment. FIG. 2 is a schematic plan view of the tip end portion of the main pole of the present embodiment at the trailing end viewed from the trailing direction. The structure shown in FIG. 15 is the same as the one in the cross-sectional schematic view at the track center of an example of the magnetic head of the present embodiment. As shown in FIG. 2, the magnetic disk 11 has a magnetic recording layer 19 and a soft-magnetic underlayer 20 which is a lower layer than the magnetic recording layer 19 on a flat non-magnetic substrate 22.

The soft-magnetic underlayer 20 has concavo-convex patterns in the radial direction (track width direction). The concavo-convex structure has concavities and convexities alternately in the radial direction and the concavities are referred to as groove and the convexities are referred to as lands. Similarly, the magnetic recording layer 19 has lands and grooves alternately in the track width direction along with the shape of the soft-magnetic underlayer 20. Lands of the soft-magnetic underlayer 20 have a land width w_land which is a size in the radial direction.

Further, left-side grooves of the respective lands on the soft-magnetic underlayer 20 have a groove width w_groove_1 and right-side grooves have a groove width w_groove_2. Typically, the left-side and right-side groove widths w_groove_1 and w_groove_2 are the same size. In the structure of FIG. 2, the track width for recording data is defined by the land width w_land of the soft-magnetic underlayer 20.

The magnetic head 14 contains a main pole tip 1B (main pole 1) and side shields 33. As shown in FIG. 15, the magnetic head 14 is a recording and reproducing combined head comprising a recording head (single pole head) 25 having a main pole 1 and an auxiliary pole 3 and a reproducing head 24 having a reproducing element 7. The reproducing element 7 made of a giant magneto-resistive effect element (GMR), a tunnel magneto-resistive effect element (TMR), or the like is located between a pair of magnetic shields (reproducing shields) constituted by a lower shield 8 on the leading side and an upper shield 9 on the trailing side.

The main pole 1 and the auxiliary pole 3 are magnetically bonded via a pillar 17 at a position away from the flying surface and a thin film coil 2 is wound around the magnetic circuit consisted by the main pole 1, the auxiliary pole 3, and the pillar 17. The main pole 1 is located at the leading side of the auxiliary pole 3. The main pole 1 is constituted by a main pole yoke 1A bonded to the auxiliary pole 3 via the pillar 17 and a main pole tip 1B exposing on the head flying surface and defining the track width.

The magnetic substance 32 (trailing shield) positioned at the trailing side of the main pole tip 1B is a shield for increasing field gradient of the vertical component profile of the head field in the head traveling direction. The magnetic substances 33 (side shields) positioned at the both sides of the track width direction of the main pole tip 1B are shields to reduce the field leakage toward the track width direction and to narrow distribution of the recording field in the track width direction.

In the magnetic head 14 according to the present embodiment, the main pole tip 1B has a width Pw defining the track width as shown in FIG. 2. Besides, the magnetic head 14 has side gap lengths $s\_g1\_1$ and $s\_g1\_2$ which are the distances between the respective side shields 33 and the main pole tip 1B. Typically, the left gap length $s\_g1\_1$ and the right gap length $s\_g1\_2$ are the same size.

As shown in FIG. 2, in the present embodiment, the sum of the left and the right gap lengths $s\_g1\_1$ and $s\_g1\_2$ and the width Pw defining the track width of the main pole tip 1B is not more than the sum of the land width $w\_land$ of the underlayer 20 of the discrete track and the both widths of its left and right grooves $w\_groove\_1$ and $w\_groove\_2$. That is, the relationship in the following Formula 1 is satisfied.

$$Pw+s\_g1\_1+s\_g1\_2 \leq w\_land+w\_groove\_1+w\_groove\_2 \quad \text{(Formula 1)}$$

In the formula 1, the left part is a sum of the left and right gap lengths $s\_g1\_1$ and $s\_g1\_2$ and the width Pw defining the track width of the main pole tip 1B. The right part is a sum of the land width $w\_land$ of the soft-magnetic underlayer 20 and the both widths of its left and right grooves $w\_groove\_1$ and $w\_groove\_2$. This configuration can effectively suppress the field strength applied to the adjacent tracks by means of the side shields 33 so that a magnetic recording device with higher density can be provided while suppressing deletion and attenuation of data on the adjacent tracks.

The field generated by the main pole 1 of the recording head 25 forms a magnetic circuit passing through a magnetic recording layer 19 and the soft-magnetic underlayer 20 of the magnetic recording medium 11 and entering the auxiliary pole 3 to record a magnetic pattern on the magnetic recording layer 19. An intermediate layer may be formed between the magnetic recording layer 19 and the soft-magnetic underlayer 20. As materials for the non-magnetic intermediate layer, FeTaZr, CoTaZr, and the like are used. The intermediate layer can change the characteristics of the magnetic recording film. Changing the film thickness can adjust the field strength and the field gradient.

In the magnetic recording medium according to embodiments of the present invention, non-magnetic films (refer to the non-magnetic films 21 of FIG. 8) may be formed in the grooves (concavities) of the recording layer to planarize the medium surface as necessary. In addition, in the magnetic recording medium according to embodiments of the present invention, a protective film is preferably formed on the recording layer 19 or non-magnetic films. Further, a non-magnetic layer may be interleaved between the flat part 20b of the soft-magnetic underlayer 20 and the convexities (lands) 20a of the soft-magnetic underlayer 20. As materials for a non-magnetic layer, such as Ru are used.

As materials for the soft-magnetic underlayer 20, FeCo series, FeCob, FeCoV, FeSi, FeSib-C and the like are used for materials with large saturation flux density. As materials with smaller saturation flux density, CoTaZr, CoZrNb, FeNi, FeCr, NiFeO, AlFeSi, NiTaZr, and the like are used. As materials for the recording layer 19, a CoCrPt—$SiO_2$ Granular film, an FePt ordered alloy, an artificial lattice film of Co/Pd or Co/Pt, an amorphous film of TbFeCo, and the like are used.

Figure 3:
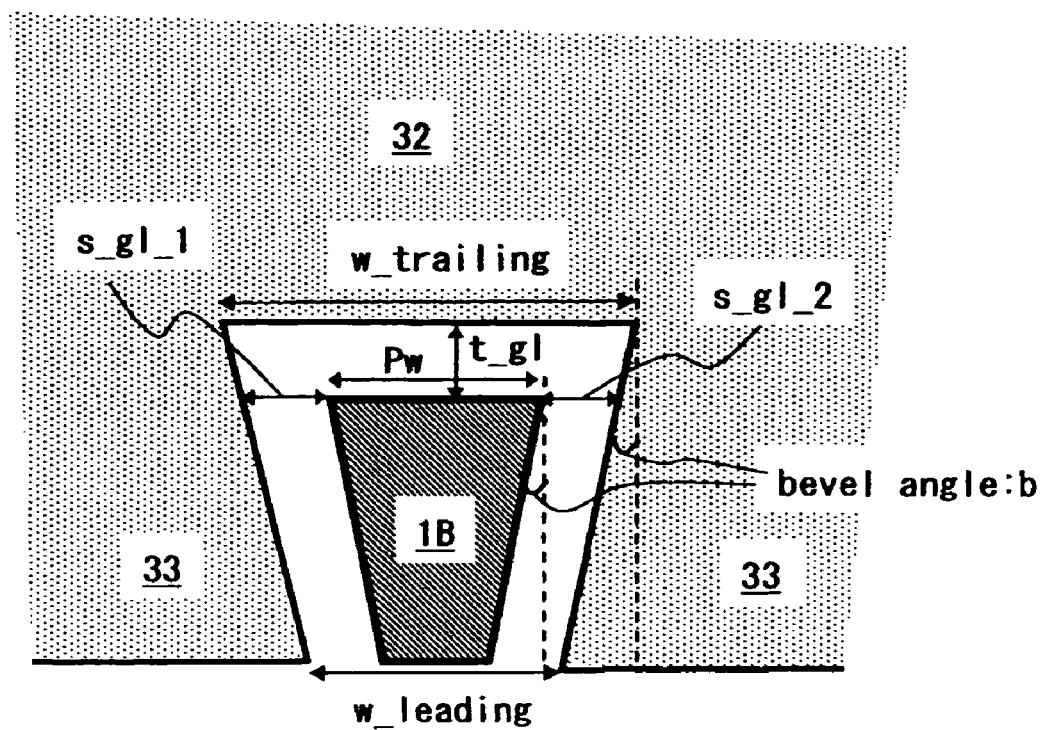
FIG. 3 is a schematic plan view of the flying surface around the main pole tip end according to the present embodiment.

FIG. 3 schematically shows the shapes of the recording head 25 and its surrounding part viewed from the flying surface of the head slider 105 (magnetic disk facing surface). The top of the FIG. 3 is the trailing side and the bottom is the leading side. The magnetic head 14 has side shields 33 on both of the right and left sides of the main pole tip 1B in the radial direction. Besides, it has a trailing shield 32 on the trailing side of the main pole tip 1B in the circumferential direction.

In the example of FIG. 3, the trailing shield 32 and the side shields 33 are formed continuously. The respective sides of the trailing shield 32 and the side shields 33 facing the main pole tip 1B are formed to trace the outline of the main pole tip 1B. Namely, the main pole tip 1B and the respective facing sides of the trailing shield 32 and the side shields 33 are parallel to each other.

As shown in FIG. 3, the size of the trailing-side edge of the main pole tip 1B in the radial direction is the width Pw which defines the track width. The side gaps $s\_g1\_1$ and $s\_g1\_2$ are distances between the end points of the trailing-side edge with the width Pw and the side shields 33 in the direction along the trailing-side edge, respectively. The width between the right and left shields 33 on the trailing side is denoted by $w\_trailing$ and the width between the right and left shields 33 on the leading side is denoted by $w\_leading$. The gap between the trailing shield 32 and the trailing-side edge of the main pole tip 1B is a trailing gap $t\_g1$.

Here, the width $w\_trailing$ between the right and left shields 33 on the trailing-side end is desirably not more than the sum of the land width of the discrete track $w\_land$ and the left and right groove widths $w\_groove\_1$ and $w\_groove\_2$. Namely, it is preferable that the following formula 2 is satisfied.

$$w\_trailing \leq w\_land+w\_groove\_1+w\_groove\_2 \quad \text{(Formula 2)}$$

Thereby, a strong writing field generated on the trailing-side edge of the main pole tip 1B can reliably suppress deletion and attenuation of data on the adjacent tracks.

From the same point of view, if the side shields 33 are formed along the bevel angle of the main pole tip 1B as shown in FIG. 3, a trailing gap $t\_g1$ is preferably configured so as to satisfy the above formula 2 with respect to the set side gaps. In other words, as shown in FIG. 3, the size of the trailing gap $t\_g1$ is preferably set so as to satisfy the following formula 3 with respect to the set side gaps $s\_g1\_1$ and $s\_g1\_2$, wherein the bevel angle is denoted by b.

$$2 \times t\_g1 \leq ((w\_land+w\_groove\_1+w\_groove\_2)-(Pw+s\_g1\_1+s\_g1\_2))/\tan(b) \quad \text{(Formula 3)}$$

In the example shown in FIG. 3, it will be understood that the following Formula 4 is satisfied.

$$2 \times t\_g1 \times \tan(b)+Pw+s\_g1\_1+s\_g1\_2=w\_trailing \quad \text{(Formula 4)}$$

Accordingly, it will be understood that it is preferable that the Formula 3 is satisfied by substituting the above Formula 2 with the Formula 4.

Further, the w_leading on the leading side is desirably not more than the sum of the land width of the discrete track w_land and the widths of left and right grooves w_groove_1 and w_groove_2. Namely, it is more preferable that the following Formula (5) is satisfied.

$$w\_leading \leq w\_land + w\_groove\_1 + w\_groove\_2 \quad \text{(Formula 5)}$$

The field generated by the main pole tip 1B is stronger at the trailing-side edge and its adjacent part and the field defines the track width. It is preferable, however, to consider data deletion and attenuation on the adjacent tracks by the field at the leading-side edge. Satisfying the above Formula 3 results in reliable suppression of the influence to the adjacent tracks by the writing field by means of the side shields 33.

Here, in the example of FIG. 3, the main pole tip 1B is line symmetric in the track width direction and has a trapezoidal shape with a narrower width of the leading part than the one of the trailing part. This is for suppressing the magnetic field at the leading part of the main pole tip 1B which deletes and attenuates data on the adjacent tracks if a skew angle exists between the magnetic disk 11 and the track as shown in FIG. 4.

In the example of FIG. 3, the side shields 33 are formed along the bevel angle of the main pole tip 1B and the shapes of the side shields 33 are formed along the outline of the main pole tip 1B. Thereby, the distance w_trailing on the trailing side of the side shields 33 is larger than the distance w_leading on the leading side. Namely, if the Formula 2 is satisfied, the Formula 3 must be satisfied.

However, some cases in which the distance w_leading on the leading side of the side shields 33 is larger than the distance w_trailing on the trailing side can be assumed. For example, the main pole tip 1B has a different shape from the above; the sides of the side shields 33 facing the main pole tip 1B are not parallel to the main pole tip 1B; and the like. In such a magnetic head, Formula 3 will be an especially important requirement.

Next, referring to FIG. 4, an example that a skew angle exists between the magnetic head 14 and the track is explained. In the HDD, the magnetic head 14 inclines with respect to the recording track at a certain angle. The angle is called as a skew angle. When the head has a skew angle, the leading-side part of the side shield 33 for the recording head 25 protrudes toward the adjacent track. From the view point of embodiments of the present invention, it is preferable that the end portion P1 of the side shield 33 is located closer to the main pole 1 rather than the land of the adjacent track, that is, the end portion P1 does not overlap the land of the adjacent track so as for the magnetic flux not to flow onto the edge of the land (the land of the soft-magnetic underlayer 20 in the example of FIG. 3) which defines the track width of the adjacent track.

The maximum angle of the angle at which the magnetic head 14 inclines with respect to the track, a so-called skew angle, is denoted by S and the distance between the leading end P1 of the side shield 33 which is a magnetic substance and is located in the track width direction of the main pole 1 and the inner end portion P2 of the trailing shield located at the opposed corner to P1 is denoted by L1. The length of the line that the L1 is projected in the track width direction at the skew angle S is denoted by L1'. The sum of the land (convexity) width w_land of the soft-magnetic underlayer 20 and its left and right grooves (concavities) width w_groove_1 and w_groove_2 (w_land+w_groove_1+w_groove_2) is denoted by L2. In this case, the L2 is preferably not more than the L1. In order to satisfy this relationship, a magnetic head having the trailing gap length, the film thickness of the main pole tip 1B, the track width, the side gap length, and the leading-side width w_leading of the magnetic head 14 may be used.

With regard to the magnetic head/magnetic disk according to the present embodiment and the magnetic head/magnetic disk having a conventional structure, recording fields generated from the respective main poles are calculated by three dimensional magnetic field calculation. Here, the widths w_land of the lands (convexities) of the soft-magnetic underlayers 20 are 50 nm and the side gaps s_g1_1 and s_g1_2 are the same in left and right, 85 nm each in the conventional structure and 35 nm each in the configuration of the present embodiment. The widths Pw of the main pole tips 1B are 80 nm. Therefore, the configuration of the present embodiment used in the calculation satisfies the conditions of the Formula 1.

The other conditions for the calculation are as follows. The main pole tip 1B has 8 degrees of bevel angle b at the tip end and has a trapezoidal shape with a narrower width in the leading part. The film thickness is 200 nm. The gap t_g1 between the main pole tip 1B and the trailing shield 32 is 50 nm. The material of the main pole tip 1B is assumed to be CoNiFe with saturation flux density of 2.4 T and relative magnetic permeability of 500. The yoke 1A of the main pole 1 is assumed to be 80 at % Ni-20 at % Fe with saturation flux density of 1.0 T. The auxiliary pole 3 is assumed to be of a material with saturation flux density of 1.0 T, and as for the size, 30 μm in width in track width direction, 16 μm in length in element height direction, and 2 μm in film thickness.

The upper shield 9 and the lower shield 8 are assumed to be 80 at % Ni-20 at % Fe with saturation flux density of 1.0 T, and as for the size, 32 μm in width in track width directions, 16 μm in length in the element height directions, and 1.5 μm in film thickness. The material of the magnetic substance 32 is assumed to be 45 at % Ni-55 at % Fe with saturation flux density of 1.7 T and relative magnetic permeability of 1000. The record current value of 35 mA and 5-turn coils are assumed.

As the material of the soft-magnetic underlayer 20 of the magnetic recording medium, a material with saturation flux density of 1.35 T is assumed. The thickness of the flat part of the soft-magnetic underlayer 20 is 50 nm and the thickness of the land (convexity) of the soft-magnetic underlayer 20 is 50 nm. The width of the land (convexity) of the soft-magnetic underlayer 20 is 50 nm and the width of the groove (concavity) is 50 nm. The recording field is calculated at the position where the center position of the magnetic recording layer is 15 nm above the head flying surface. With regard to the magnetic recording layer 19, the distance between the magnetic head whose film thickness only is taken into account and the surface of the underlayer is 31 nm. For the configuration of the conventional structure of magnetic head/magnetic recording medium with 85 nm of side gap length, calculation has been made under the same conditions as the foregoing example on both of the shape and material other than the size of the side shields.

Figure 5A:
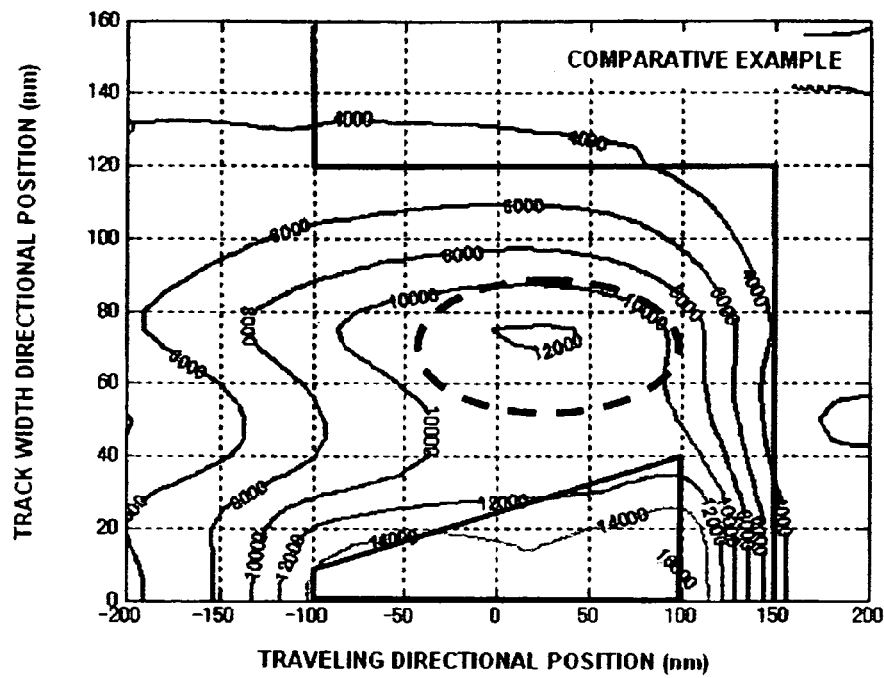
FIGS. 5(a) and 5(b) show field contour maps of the example of the present embodiment and the comparative example.
Figure 5B:
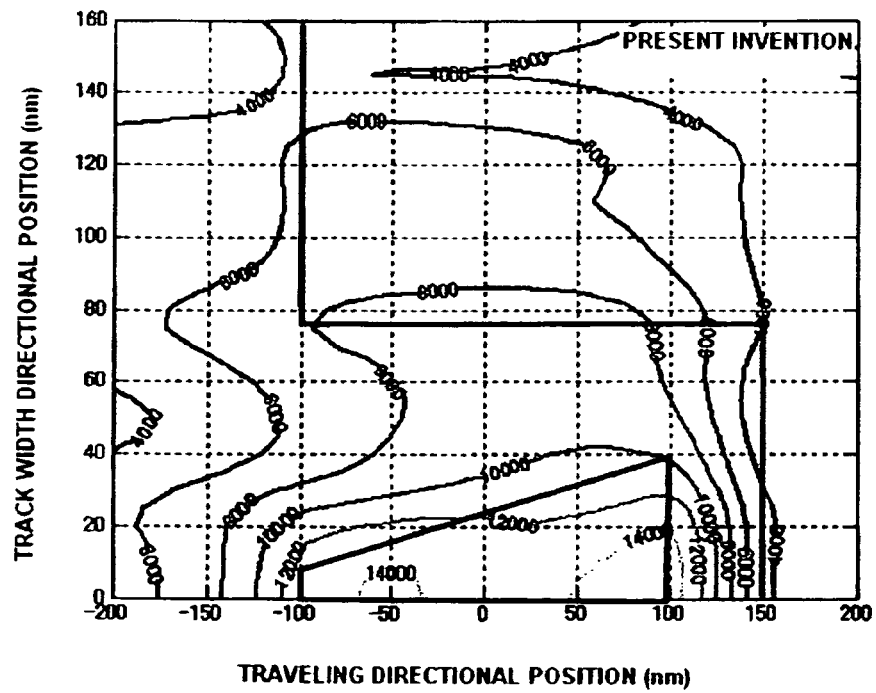

FIG. 5 show field contour maps in field distributions. The spacing between contours corresponds to 2000 (×1000/4π(A/m)). FIG. 5(a) is of a comparative example with the conventional structure; FIG. 5(b) is of the present embodiment. In FIG. 5(a), the field strength is stronger near the adjacent tracks encircled by the dotted line. The rate is smaller in embodiments of the present invention.

Figure 6A:
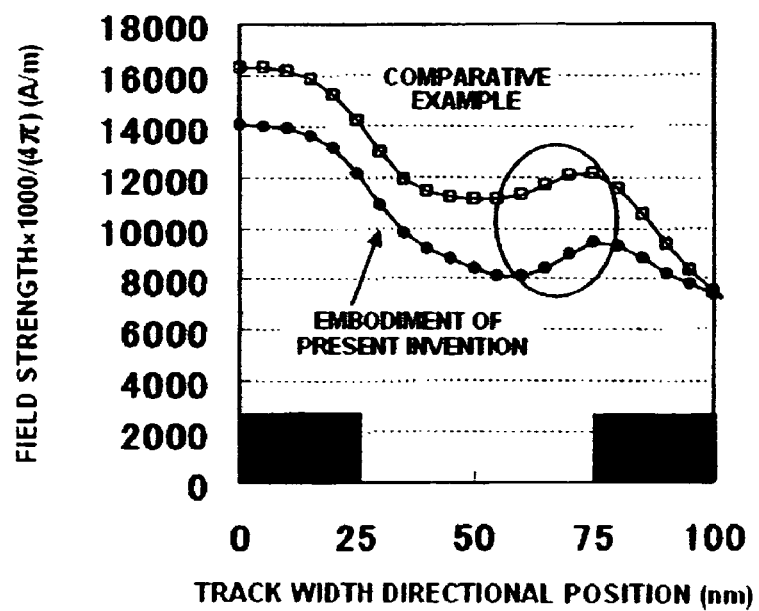
FIGS. 6(a) and 6(b) show field distributions in the track width direction of the example of the present embodiment and the comparative example.
Figure 6B:
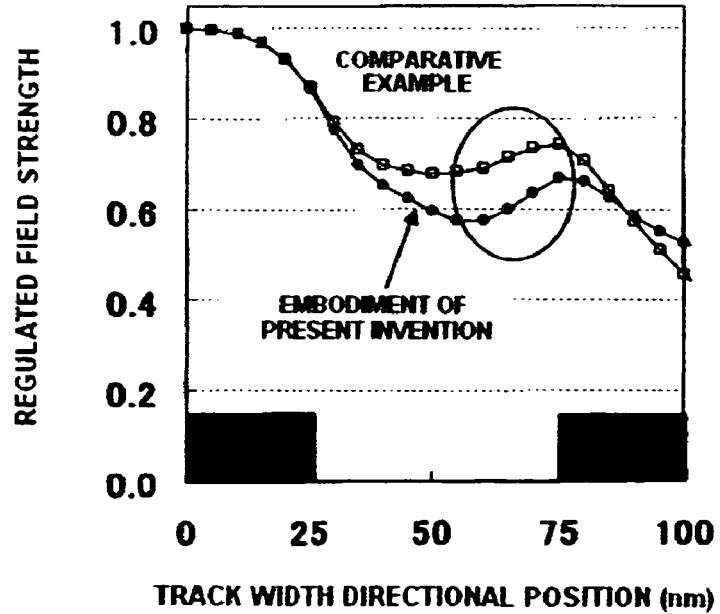

FIG. 6 show field distributions in the track width directions. The horizontal axis of FIG. 6(a) represents track-width directional positions, the vertical axis represents record field strength. The field strength applied to near the adjacent track edge is revealed to have been able to be decreased by approximately 3000 (×1000/4π(A/m)). FIG. 6(b) shows relative values to the field strength at the center of the track represented by the vertical axis. In this configuration, comparing to the conventional configuration, the rate of the field strength around the adjacent track edge to the field strength at the center of track can be reduced by approximately 10%. This is because that the side shields are closer to the main pole than the adjacent track edge of the land (convexity) of the soft-magnetic underlayer so that the amount of magnetic flux flowing onto the adjacent track edge of the land (convexity) of the soft-magnetic underlayer decreases in the configuration of this embodiment.

Figure 7:
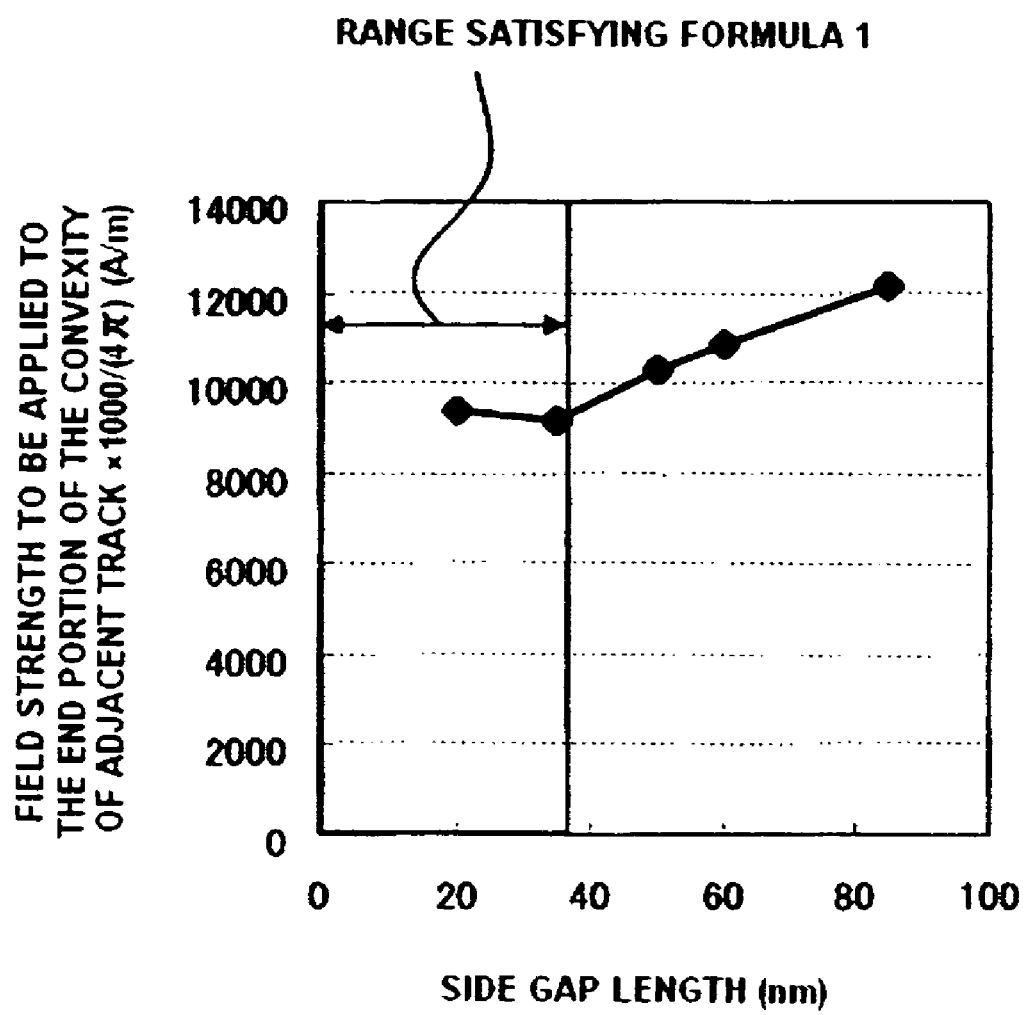
FIG. 7 shows side gap length dependence of the field strength applied to the end portion of the convexity of the adjacent track according to the present embodiment.

FIG. 7 shows side gap length dependence of the magnetic field applied to the adjacent track edge. The horizontal axis represents the side gap length; and the vertical axis represents the field strength at the position of the adjacent track. If the gap length is within the range satisfying the Formula 1, the field strength to be applied to the end portion of the convexity of adjacent track is sufficiently small. Using such an above-described magnetic head of the present embodiment can suppress the field strength applied to the adjacent tracks in the patterned vertical magnetic recording medium and provide a magnetic recording device with suppressed data deletion and attenuation on the adjacent tracks and with higher density.

Figure 12:
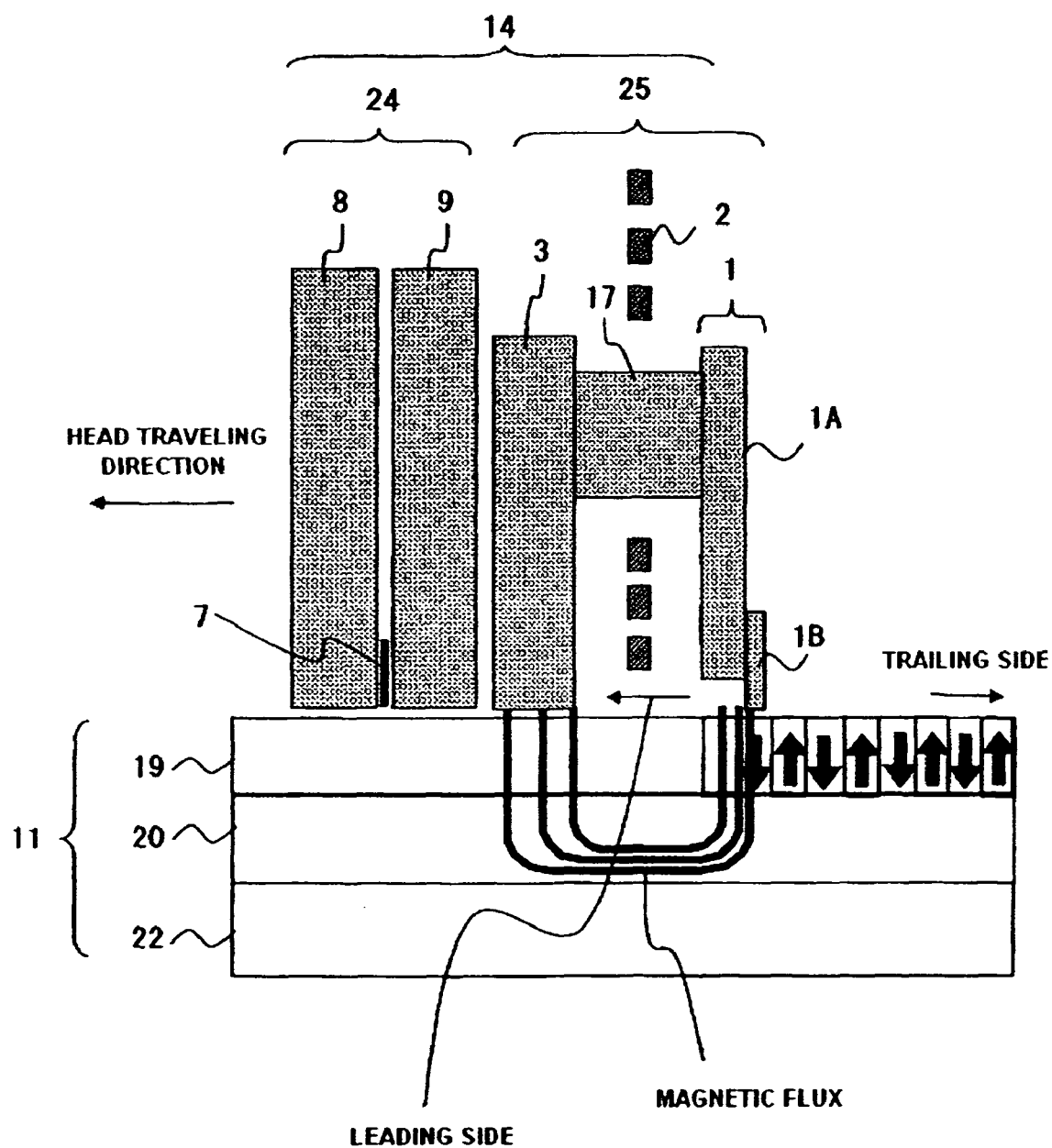
FIG. 12 is a schematic cross-sectional view at the center of the track of the magnetic head and magnetic recording medium according to a conventional technique.
Figure 13A:
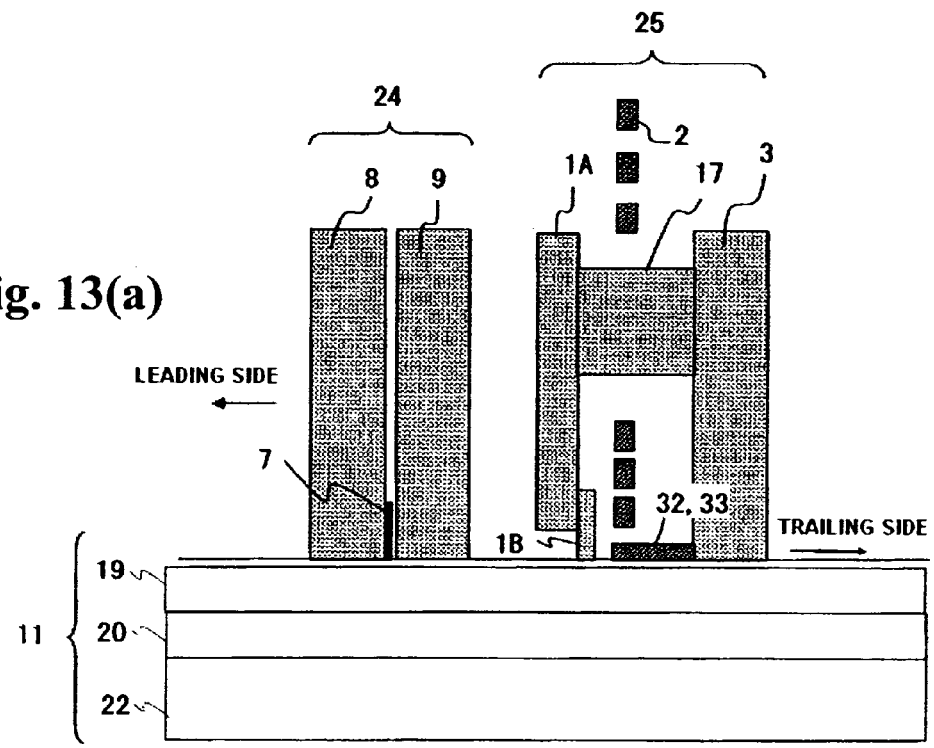
FIGS. 13(a) and 13(b) are schematic cross-sectional views at the center of the track of the magnetic head and magnetic recording medium and a schematic plan view of the flying surface according to a conventional technique.
Figure 13B:
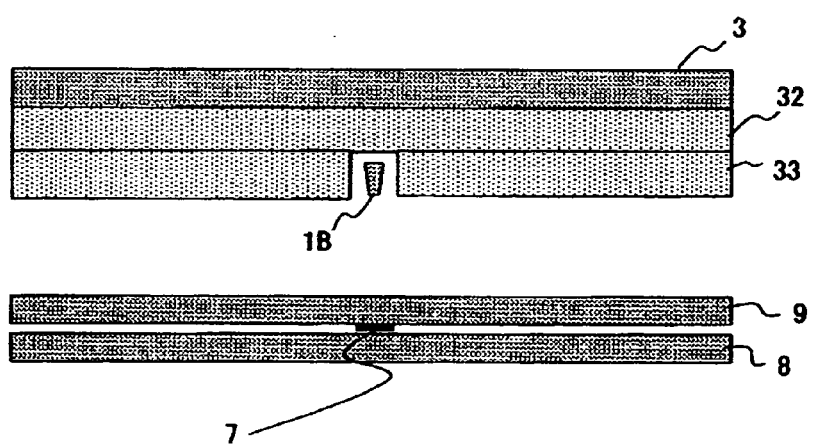
Figure 14:
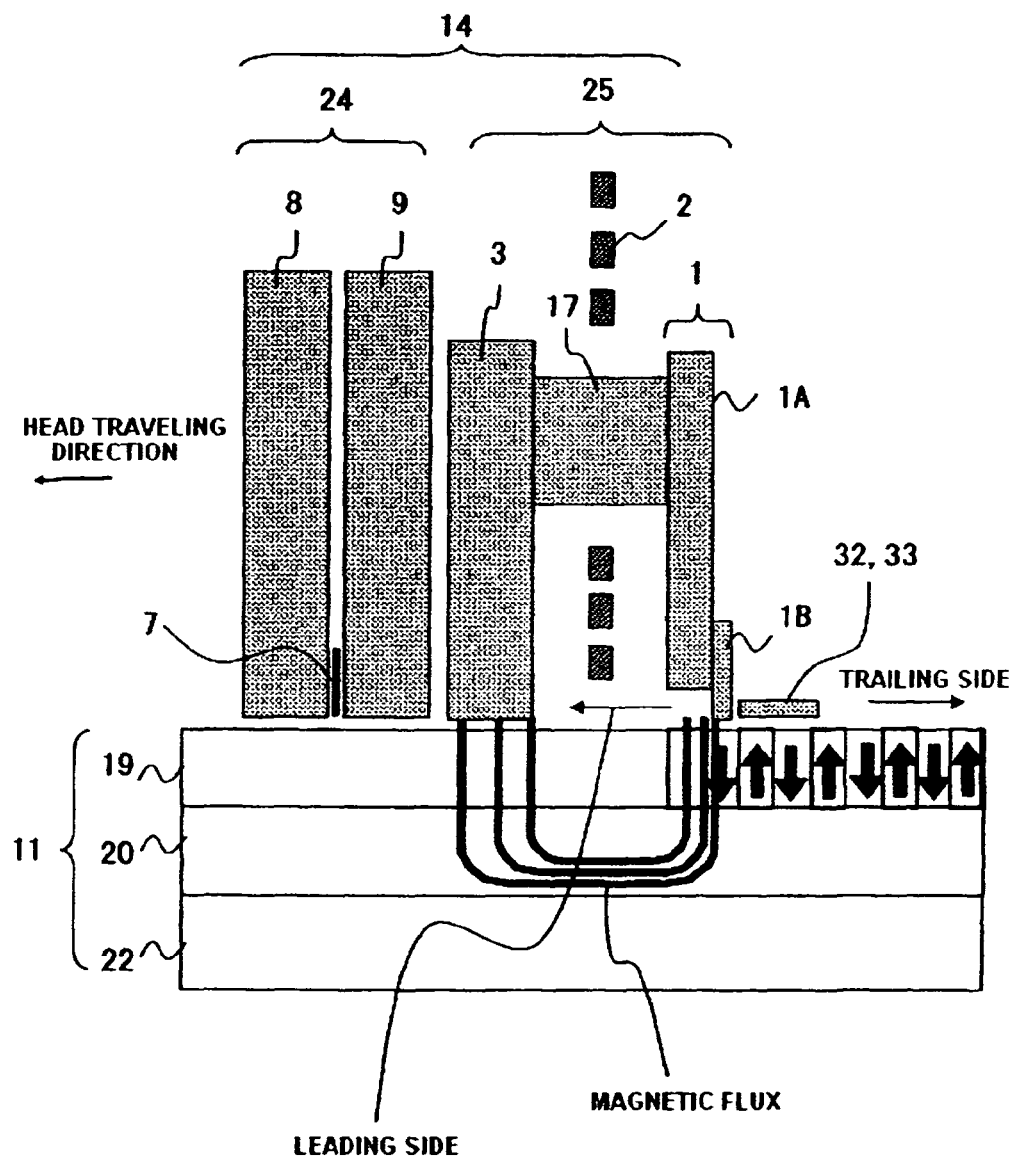
FIG. 14 is a schematic cross-sectional view at the center of the track of the magnetic head and magnetic recording medium according to a conventional technique.
Figure 15A:
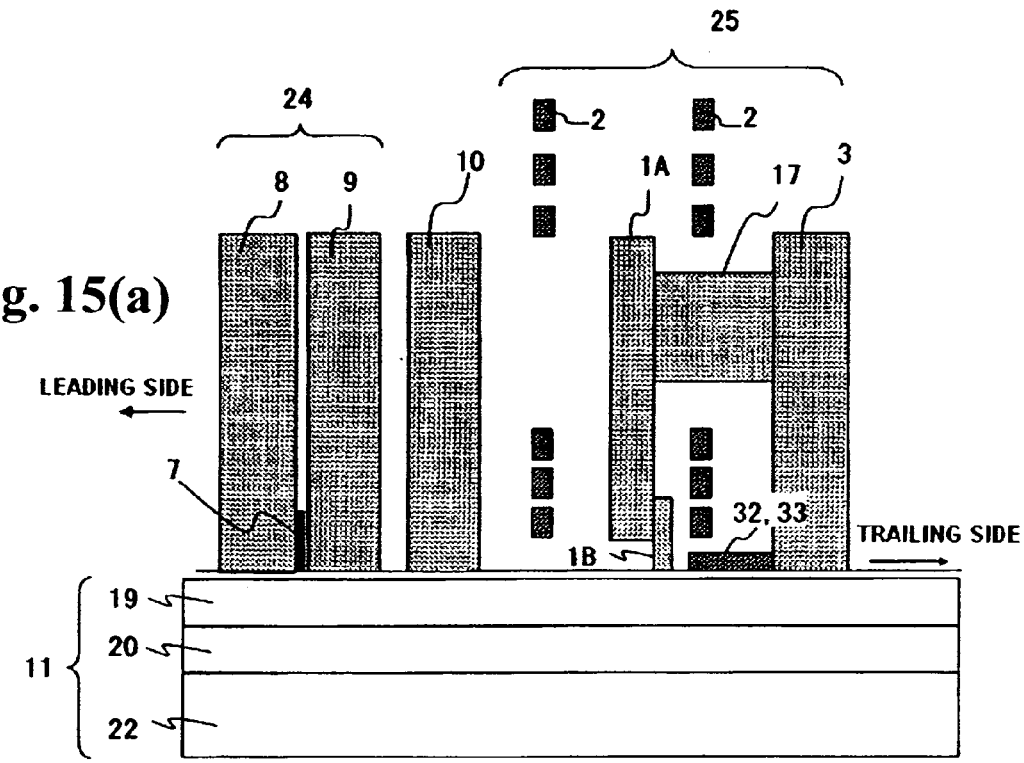
FIGS. 15(a) and 15(b) are schematic cross-sectional views at the center of the track of the magnetic head and magnetic recording medium and a schematic plan view of the flying surface according to a conventional technique.
Figure 15B:
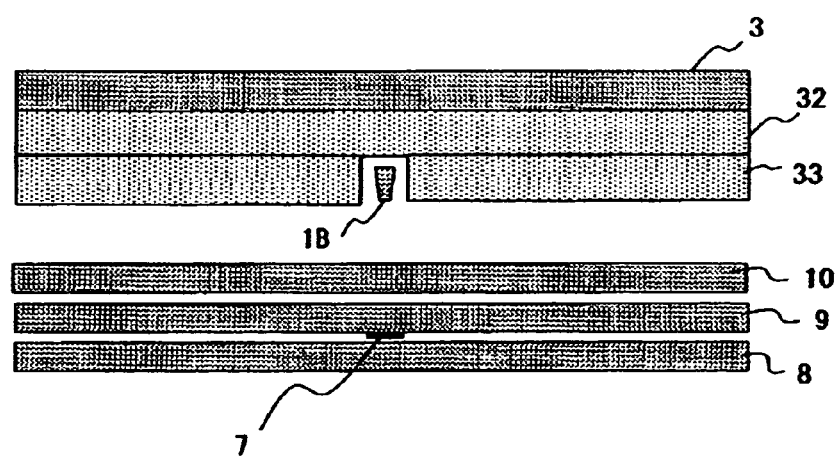

The head structure of embodiments of the present invention may be a structure that as shown in FIG. 15(a), the thin film coils 2 are provided on the trailing side and the leading side of the main pole 1, a structure that as shown in FIG. 13(a), the thin film coil 2 is provided on the trailing side only, or a structure that as shown in FIGS. 12 and 14, the thin film coil 2 is provided on the leading side only. The coil may be, as shown in FIG. 15(a), a coil which is wound around the main poles 1A and 1B, a so-called helical coil or other type of coil. As the head structure as shown in FIGS. 13(a) and 15(a), the auxiliary pole 3 may be provided on the trailing side of the main pole 1; or as shown in FIGS. 12 and 14, the auxiliary pole 3 may be provided on the leading side of the main pole 1. A coil may not be provided between the reproducing shield 9 and the main pole 1 as shown in FIG. 13(a), and an auxiliary shield 10 shown in FIG. 15(a) may not be provided.

With regard to the shape of the air bearing surface of the pole tip, the end portion of the side shield (the end portion facing the main pole tip 1B) may be along the side face of the main pole tip as shown in FIG. 3, or may not. The side shields and the trailing shield may be separated. Or, the trailing shield may not exist but only the side shields do in order to increase the field strength. In any structure, the effects of embodiments of the present invention can be obtained. It is apparent that, if the trailing shield does not exist, the distance w_leading between the side shields on the leading side and the distance w_trailing on the trailing side can be defined.

In the above description, the side gap length in the track width of the magnetic head has been determined by the widths of the concavity and convexity on the soft-magnetic underlayer of the magnetic disk, i.e., the land and groove widths. However, it is obvious that in order to obtain the configuration of embodiments of the present invention, determining the widths of the concavity and convexity of the underlayer of the magnetic recording medium in association with the side gap length of the magnetic disk enables to accomplish the same effects.

Figure 8:
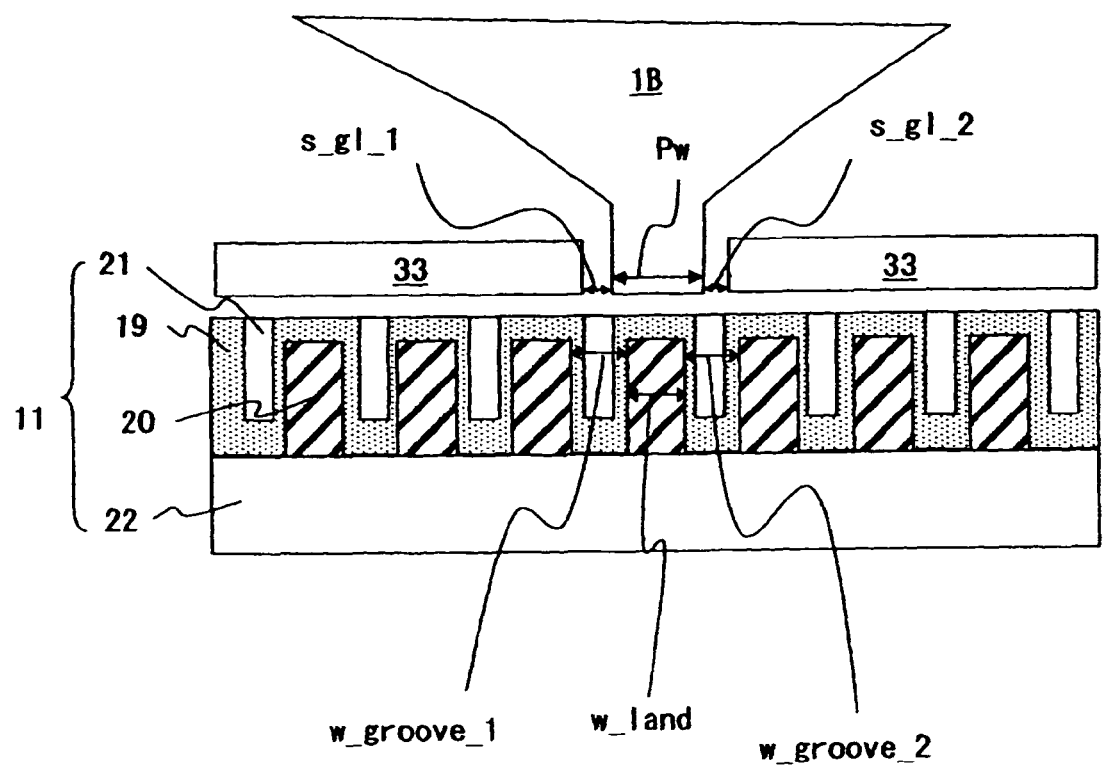
FIG. 8 is a schematic plan view of another example of the magnetic head and magnetic recording medium according to the present embodiment at the trailing end of the main pole viewed from the trailing direction.
Figure 9:
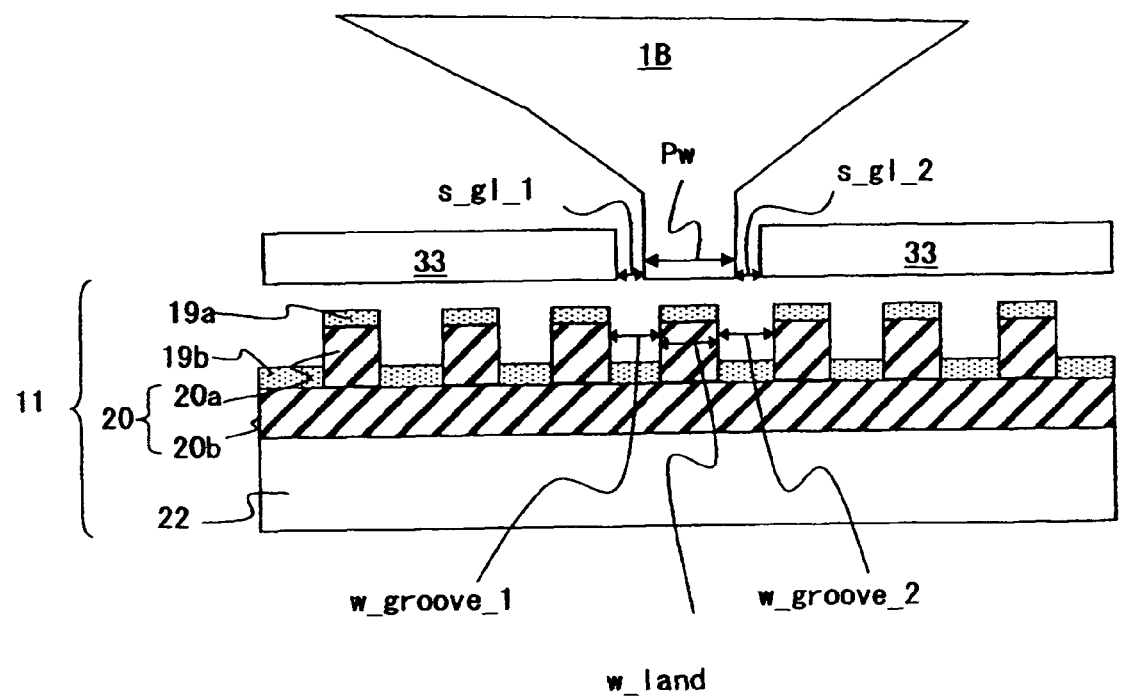
FIG. 9 is a schematic plan view of yet another example of the magnetic head and magnetic recording medium according to the present embodiment at the trailing end of the main pole viewed from the trailing direction.

As shown in FIG. 8, the soft-magnetic underlayers 20 may be completely separated from the adjacent tracks. Non-magnetic films 21 may be formed in the grooves of the magnetic recording layer 19. As shown in FIG. 9, the magnetic recording layers 19 may not be formed on the side surfaces of the lands of the soft-magnetic underlayers 20. Although magnetic films 19b of the same material as layers 19a to be magnetically recorded on the lands of the under layers 20 may be formed in the grooves of the soft-magnetic underlayers 20 in manufacturing steps, magnetic films 19b are not used as recording bits.

Figure 10:
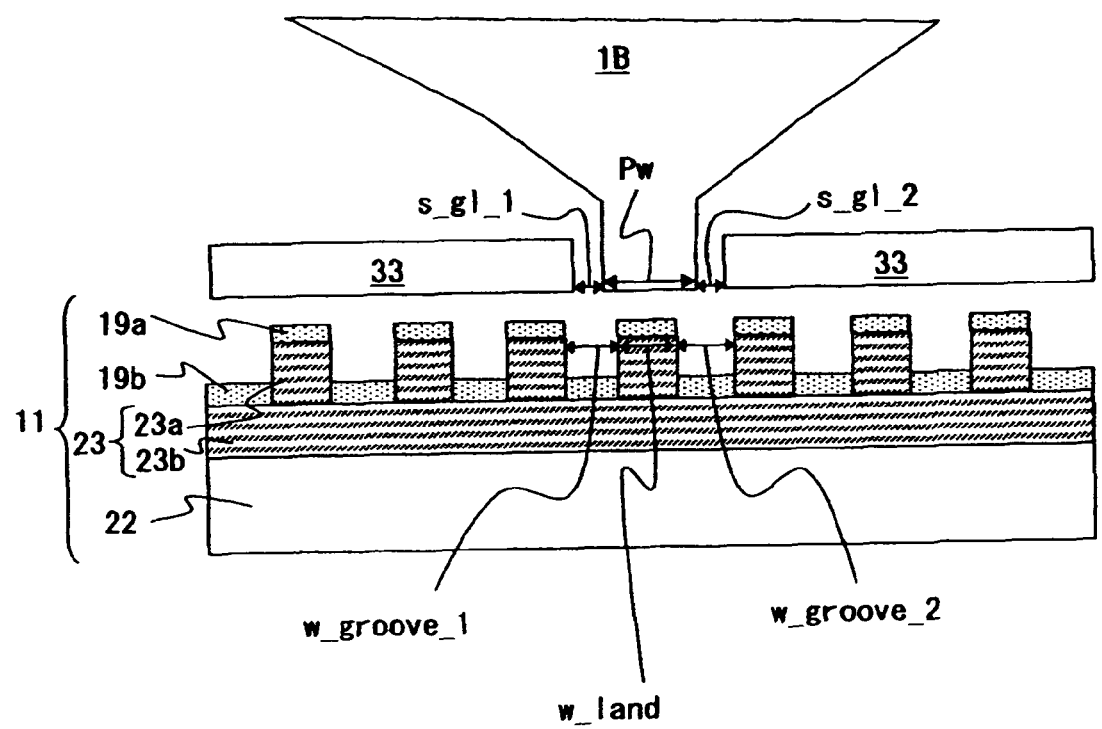
FIG. 10 is a schematic plan view of yet another example of the magnetic head and magnetic recording medium according to the present embodiment at the trailing end of the main pole viewed from the trailing direction.
Figure 11:
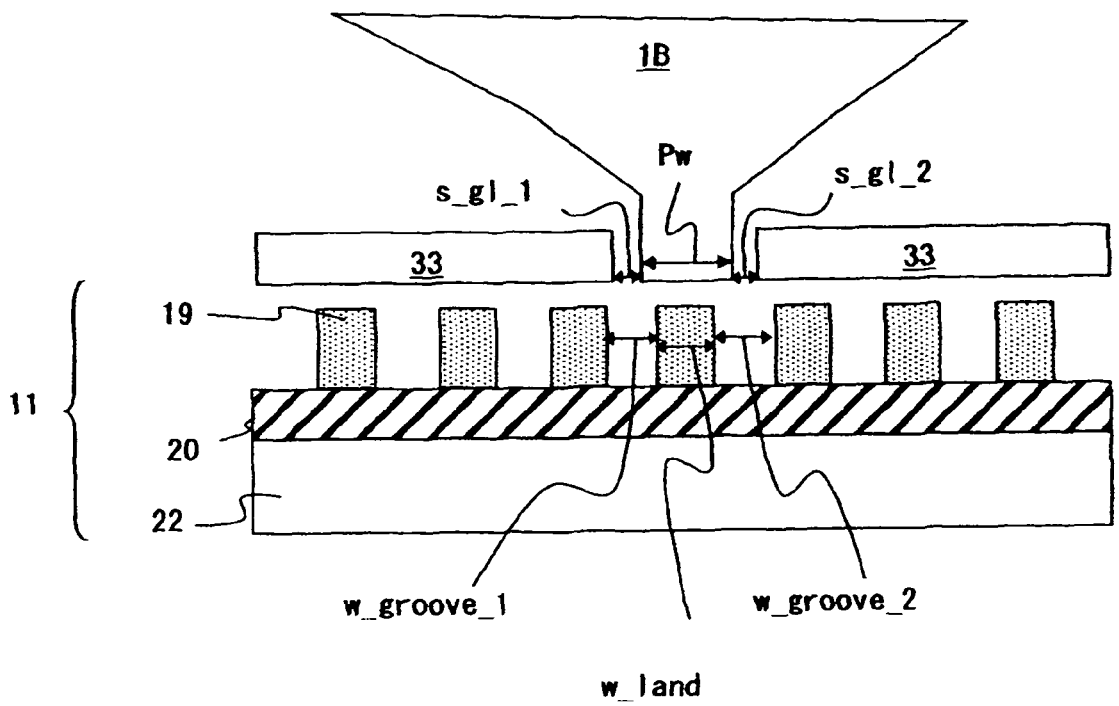
FIG. 11 is a schematic plan view of yet another example of the magnetic head and magnetic recording medium according to the present embodiment at the trailing end of the main pole viewed from the trailing direction.

As shown in FIG. 10, in the case that the underlayer 20 does not exist, applying the configuration of the present invention to the widths of the concavities and convexities of the magnetic recording layer 19 or the non-magnetic layer 23 results in achieving the effect of the invention. Or, it is possible that forming the concavo-convex structure on the substrate 22 results in forming a land and groove structure on the magnetic recording layer 19. In the example of FIG. 10, a magnetic film 19b is formed in the groove (concavity) of the non-magnetic layer 23, but the magnetic film 19b may not exist in the groove of the non-magnetic layer 23. Or, being different from these structures, a flat soft-magnetic underlayer 20 may be formed on the substrate 22 and a magnetic recording layer 19 having a concavo-convex structure constructing lands and grooves thereon may be formed as shown in FIG. 11.

As described foregoing, embodiments of the present invention can be applied to a magnetic disk having a concavo-convex structure in which lands and grooves to define the track width are formed on the magnetic recording layer and/or its underlayer. The track width is defined by the land width of the magnetic recording layer or its underlayer. For example, in the structure of FIGS. 2 and 8, the land width of the soft-magnetic underlayer 20, which is an underlayer, is smaller than the land width of the magnetic recording layer 19 so that the land width of the soft-magnetic underlayer 20 defines the track width. In the structure of FIG. 9, the land widths of the magnetic recording layer 19 and the soft-magnetic underlayer 20 are the same. In the structure of FIG. 10, the land width of the magnetic recording layer 19 defines the track width. Land widths are sometimes different in the top side and the bottom side, but the width of the top side on which the magnetic flux is likely to be concentrated becomes the land width to define the track width and the distance between the top sides of the lands becomes the groove width. As apparently, the track width is defined by both of the land width of the magnetic disk and the width between the poles of the magnetic head.

Embodiments of the present invention can be applied to the patterned media in which concavities and convexities are provided in the bit direction of the land as shown in FIG. 16(b). Satisfying the above-described configuration achieves suppressing the field intensity to be applied to the adjacent tracks in the perpendicular magnetic recording medium to provide a magnetic disk device with suppressed data deletion and attenuation on the adjacent tracks and with higher density. If the magnetic recording medium is the one in which the concavities and convexities for defining the tracks are provided in the down-track direction and the concavities and convexities for defining the recording bit are provided in the bit direction, the effects of embodiments of the present invention can be achieved in thermal assist recording and longitudinal magnetic recording.

As set forth above, the present invention has been described by way of certain embodiments, but is not limited to the above embodiments. A person skilled in the art can easily modify, add, and convert the each element of the above embodiments within the scope of the present invention. For example, embodiments of the present invention can be applied to a magnetic disk device other than the HDD or to a magnetic disk device equipped with a magnetic head having only a recording head.

What is claimed is:

1. A magnetic disk device comprising:
a magnetic disk for perpendicular magnetic recording having a magnetic recording layer and an underlayer under the magnetic recording layer, and further including a groove and a land for defining a track width on at least one of the magnetic recording layer and the underlayer; and
a magnetic head for perpendicular magnetic recording having a main pole, an auxiliary pole, and side shields which are located on the both sides of the cross-track direction of the main pole and are made of a magnetic substance; wherein
a first sum of a width of the main pole in the cross-track direction and both side gaps between the main pole and the side shields on both sides of the main pole is less than a second sum of a width of the land in the cross-track direction and widths of grooves on both sides of the land in the cross-track direction.

2. The magnetic disk device according to claim 1, wherein a distance between respective trailing-side ends of the both side shields is less than the second sum of the width of the land and the widths of grooves on both sides of the land.

3. The magnetic disk device according to claim 1, wherein a distance between respective leading-side ends of the both side shields is less than the second sum of the width of the land and the widths of grooves on both sides of the land.

4. The magnetic disk device according to claim 1, wherein
a maximum angle of a skew angle of the magnetic head to a track is denoted by S,
a distance from a leading-side end of one of the side shields to an inner-side end of the other side shield located on its opposed corner is denoted by L1,
a length of a line that the L1 is projected in the track width direction at the maximum skew angle S is denoted by L1',
a sum of the width of the land and the widths of the grooves on the both sides of the land is denoted by L2, and
the L2 is not less than the L1'.

5. The magnetic disk device according to claim 1, wherein the underlayer is a soft-magnetic underlayer.

6. The magnetic disk device according to claim 1, wherein the underlayer is a non-magnetic layer and the magnetic recording layer has a groove and a land for defining the track width.

7. The magnetic disk device according to claim 1, wherein concavities and convexities are provided on the magnetic recording layer for forming recording bits in a bit direction.

* * * * *